Nov. 10, 1959 W. L. GENSEL 2,912,574
POWER SAVING AND DECODING CIRCUIT FOR RADIO RECEIVER
Filed Aug. 19, 1957
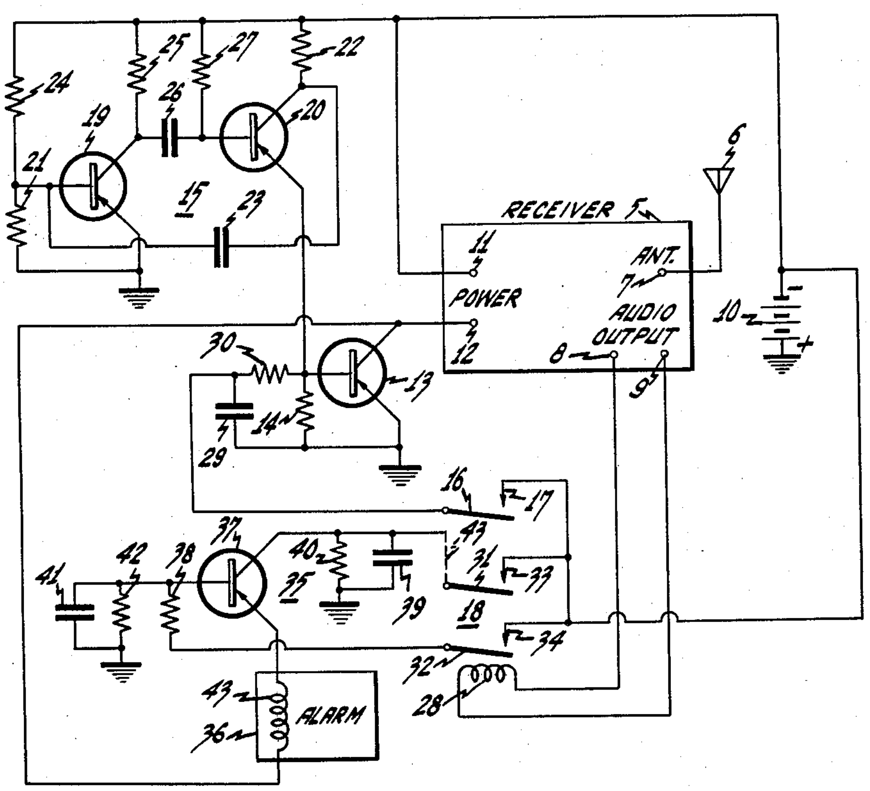
INVENTOR.
WILLIAM L. GENSEL
BY Charles H. Brown
ATTORNEY United States Patent Office 2,912,574

Patented Nov. 10, 1959

2,912,574

POWER SAVING AND DECODING CIRCUIT FOR RADIO RECEIVER

William L. Gensel, Drexel Hill, Pa., assignor to Radio Corporation of America, a corporation of Delaware Application August 19, 1957, Serial No. 678,958

19 Claims. (Cl. 250—20)

The invention relates to power saving and decoding circuits, and particularly to a power saving and decoding circuit for conserving battery power and for performing a decoding function in radio receivers used, for example, in paging systems wherein a compact, portable, lightweight receiver is carried on the person.

A general object of the invention is to provide an improved circuit for performing both power saving and decoding functions.

Another object is to provide a novel power saving and decoding circuit which is small and compact in construction and is especially useful with special, small, lightweight, portable radio receivers such as are used in paging systems.

A further object is to provide an improved power saving circuit for use with a radio receiver of the paging type, the circuit normally causing the receiver to be intermittently placed in an "on" condition (in which the receiver can receive signals) and causing the receiver to be continuously held in an "on" condition upon the occurrence of a predetermined condition during one of the intermittent operating or "on" periods.

A still further object is to provide an improved power saving and decoding circuit which is simple and reliable in operation and requires a minimum number of components.

The above and other objects are attained in a circuit arrangement including an electronic switching device that is connected so as to be alternately opened and closed. The switching device is connected in series with a power supply, such as a battery, and the power input circuit of a radio receiver. A pair of electron current flow control devices are regeneratively connected to form an astable multivibrator which is, in turn, connected to the switching device. The switching device alternately opens and closes in response to the switching of the multivibrator. This action causes the radio receiver to be intermittently placed in an "on" condition according to the changes in the operating condition of the switching device.

The signal output circuit of the radio receiver is connected to a frequency selective circuit arrangement which may include, for example, a vibrating reed assembly. Upon the reception by the receiver of a tone or control signal of predetermined frequency during one of the intermittent periods in which the receiver is "on" and upon the application of the control signal to the frequency selective circuit, the frequency selective circuit functions in response to the control signal to cause the switching device to be held in the closed condition thereof. The switching device is maintained in the closed condition and the receiver is, therefore, continuously held in its "on" condition as long as the control signal is being received.

The circuit of the invention is designed to be used with a radio receiver included in a selective calling system such as a paging system. Simultaneously with or shortly after the reception of the control signal a calling signal consisting of two or more tones or signals of different frequencies is received by the receiver. The signals included in the calling signal are each of a frequency different from that of the control signal. The calling signal is fed from the receiver to the frequency selective circuit. The frequency selective circuit is set so that it is responsive only to a calling signal including a combination of signals of predetermined frequencies to operate a suitable alarm or other control circuit. Upon the termination of the calling and control signals, the frequency selective circuit returns to its standby condition, and the receiver is thereafter again intermittently placed in the "on" condition by the switching device until the control signal is again received. By setting the frequency selective circuits used with a number of receivers in a paging system so that each receiver responds to a different calling signal or combination of frequencies, a selective calling or paging system can be provided which is readily adaptable for use in various applications.

A more detailed description will now be given in connection with the single figure of the drawing which shows one embodiment of a power saving and decoding circuit constructed according to the invention.

Referring to the drawing, a radio receiver 5 is shown in block form. The receiver 5 includes the usual radio, intermediate and audio frequency amplifiers, as well as converter and detector circuits. The various circuits in the receiver 5 are preferably constructed using transistors in order to obtain the small, lightweight, and compact construction desirable in paging radio receivers. Transistorized receivers suitable for use in paging, receiving equipment are known, and the receiver 5 in itself forms no part of the instant invention.

An incoming signal is picked up by an antenna 6 and fed to the receiver 5 via an input terminal 7. The audio output of the receiver 5 appears across output terminals 8, 9. Power for the receiver 5 is obtained from a source of unidirectional potential represented by a battery 10. In the embodiment shown in the drawing, the negative terminal of the battery 10 is connected to one of the power input terminals 11, and the positive terminal of the battery 10 is connected to a common ground return connection or point of fixed or zero radio frequency reference potential, hereafter referred to as ground. The second power input terminal 12 is connected to ground over an electrical path including the collector and emitter electrodes of a PNP junction transistor 13 of N type conductivity. A resistor 14 is connected between the base electrode of transistor 13 and ground. The resistor 14 functions to bias the base electrode of the transistor 13 sufficiently in the reverse or positive direction to hold the transistor 13 cut-off or non-conducting, causing an open condition to occur in the ground return connection of the receiver 5. The receiver 5 is normally held in an "off" condition. In other words, the transistor 13 is an electronic switch which is normally open. In this condition, a complete electrical circuit from both terminals of the power supply or battery 10 to the receiver 5 is interrupted, and the receiver 5 is normally turned off.

In addition to the transistor 13, the power saving portion of the invention includes a conventional astable multivibrator or oscillator, indicated generally by the reference numeral 15, and a resonant relay, indicated generally by the reference numeral 18, having a vibrating reed 16 and contact 17. Multivibrator 15 includes two PNP junction transistors 19, 20 of N type conductivity. The transistors 19, 20 are regeneratively connected together such that the multivibrator 15 will alternate between two states. In one state, transistor 19 is cut-off and transistor 20 is conducting. In the second state, transistor 19 is conducting and transistor 20 is cut-off.

The multivibrator 15 is known in the art and need not be described in detail. Assuming that power is just applied to the transistors 19 and 20 from battery 10 the resistor 21 connected between the base electrode of transistor 19 and ground functions to bias the base electrode of transistor 19 sufficiently in the reverse direction to cause the transistor 19 to be cut-off. A path is completed from the negative terminal of battery 10 to ground, including the collector and emitter electrodes of transistor 20 and resistor 14. Transistor 20 becomes conducting. As the collector electrode end of resistor 22 becomes more positive (less negative), capacitor 23 will charge positively. After a time interval determined by the values of the resistor 22 and capacitor 23, the capacitor 23 discharges over an electrical path including the low resistance of transistor 20 and the relatively high resistance of resistor 24.

As a result of the foregoing, the base electrode of transistor 19 goes sufficiently negative to cause the transistor 19 to conduct. The collector-electrode end of resistor 25 becomes more positive (less negative), and the capacitor 26 charges positively. The positive voltage applied to the base electrode of transistor 20 biases the transistor below cut-off, and transistor 20 ceases conducting. Following a time interval determined by the values of resistor 25 and capacitor 26, the capacitor 26 will discharge over an electrical path including the low resistance of transistor 19 and the relatively high resistance of resistor 27. Transistor 20 will conduct, and so on.

The above action of the multivibrator 15 will continue regeneratively such that first one and then the other of the two possible states occur. The frequency of the multivibrator 15 or, in other words, the ratio of "on" time to "off" time for one of the transistors 19 or 20 can be adjusted by a proper selection of the values of the coupling capacitors 23, 26, base resistors 24 and 27 and the load resistors 22 and 25. In the operation of the invention these values are chosen so that the transistor 20 is on or conducting for a relatively short period of time as compared to the "on" time of the transistor 19. Capacitor 26 is made larger than capacitor 23, and so on. The values are chosen so that the ratio of "off" time to "on" time for transistor 20 is approximately 10 to 1. The ratio may, of course, be determined to meet the requirements of a particular application.

As mentioned above, the emitter electrode of transistor 20 is connected to the base electrode of transistor 13 and through resistor 14 to ground. Each time that transistor 20 conducts, the negative going voltage developed at the base electrode end of resistor 14 causes the base electrode of transistor 13 to be biased in the forward direction and transistor 13 becomes conducting. The transistor 13 or electronic switch is closed, completing the power path for receiver 5 from the battery 10 to ground. The receiver current is switched "on," and the receiver is placed in condition for receiving an incoming signal.

As the multivibrator 15 changes from one state to another, therefore, the transistor 13, acting as a switch, is first opened and then closed. The receiver 5 is by the operation of the transistor 13 intermittently turned "on." Since the transistor 20 is set to assume a conducting state for a relatively short period of time as compared to the conducting or "on" time of transistor 19, the receiver 5 will be turned "off" for a relatively long period of time as compared to the "on" time thereof.

In paging systems, it is actually necessary that a receiver be turned "on" only during the time that a calling signal destined for that receiver is being sent. However, means must be provided for operating the receiver to properly monitor the sending station so that the transmission of a calling signal is not missed. As paging receivers are for the most part operated by battery power, the conservation of power is extremely important. If the receiver 5 were to be left "on" full time, a large drain on the battery 10 would result. The life of the battery 10 would then be greatly decreased and the performance thereof would be impaired. By the arrangement of the invention, the receiver 5 is automatically turned "on" only for short periods of time to monitor the sending station. As mentioned, the ratio of "off" time to "on" time of the receiver 5 may be 10 to 1. While the transistor 19 will draw current during the "off" time of the receiver 5, the drain on the battery 10 is small. It is, of course, quite small as compared to the drain on battery 10 when the receiver 5 is turned "on." It is possible by use of the invention to effect a considerable saving in battery power.

It will now be assumed that the sending station wishes to cause the receiver 5 to perform an alerting or other function. A control signal or tone of given audio frequency is forwarded by conventional radio carrier-modulating means and applied to receiver 5 via antenna 6 and terminal 7. During the next "on" period of the receiver 5 during which time the incoming signal is still being applied to the receiver, the incoming signal is processed and the audio frequency control signal is fed across the winding 28 of relay 18 via terminals 8, 9. The vibrating reed 16 is set so that it will vibrate upon the application of the given audio frequency control signal to the winding 28. The reed 16 intermittently engages the contact 17 such that an electrical path is completed from the negative terminal of battery 10 to ground including resistors 30, 14 across which is connected a capacitor 29. The negative going vibrating voltage is smoothed by capacitor 29 and applied to the base electrode of transistor 13 through resistor 30. The base electrode of transistor 13 is biased in the forward direction and transistor 13 remains conducting.

The transistor 13 will remain conducting by virtue of the vibrating voltage applied thereto regardless of the state of multivibrator 15. Even though the multivibrator 15 will continue to change state in the manner described, the receiver 5 is continuously maintained in "on" condition by the closed condition of transistor 13. As long as the given audio frequency control signal is being received, the transistor 13 remains conducting and the receiver 5 is turned "on."

The decoding portion of the invention includes at least a pair of reeds 31, 32 and the respective contacts 33, 34 of relay 18, a conventional transistor amplifier, indicated generally by the reference numeral 35, and an alarm or other control circuit 36. Simultaneously with or immediately following the sending of the control signal, the sending station functions to transmit along with the control signal a calling signal consisting of two or more tones or signals of different audio frequencies. The signals in the calling signal are both of a frequency different from the control signal previously described. It will be assumed that the reed 31 is set to respond to one of the signals and that the reed 32 is set to respond to the other signal in the calling signal. When the incoming signal is processed and the audio signals in the calling signal are fed across the winding 28, a vibrating voltage is applied from the negative terminal of battery 10 to the base electrode of a PNP junction transistor 37 of N type conductivity through a resistor 38. At the same time, a vibrating voltage is also applied from the negative terminal of the battery 10 to the collector electrode of transistor 37. A capacitor 39 functions to smooth out the vibrating voltage applied to the collector electrode, a resistor 40 functioning as a discharge path for the capacitor 39. A capacitor 41 functions to smooth out the vibrating voltage applied to the base electrode, a resistor 42 functioning as a discharge path for the capacitor 41.

The transistor 37 which is normally non-conducting is by the action of the reeds 31, 32 biased in the conducting direction and becomes conducting. Current flows through the transistor 37 over an electrical path including the winding 43 of an alarm device 36 and the transistor 13 which is also conducting at this time. The winding 43 is energized, and the alarm 36 is operated. The alarm may be a buzzer, a lamp or any other desired control circuit. While the alarm device 36 is shown in the emitter electrode circuit, the device 36 could just as well be inserted in the collector electrode circuit of transistor 37.

Upon termination of the calling signal and of the control signal, all three reeds 16, 31 and 32 will stop vibrating. Transistor 37 will become non-conducting, and the alarm circuit 36 is turned off. As the vibrating voltage is no longer applied to the base electrode of transistor 13, the transistor 13 will again be operated under the control of the multivibrator 15. As the multivibrator 15 changes from one state to another, the transistor 13 will be switched "on" and "off." The receiver 5 will be turned "off" and "on" by the action of the transistor 13 until such time as the control signal is again received. At that time the above circuit operations will be repeated.

The arrangement of the invention is readily adaptable for use with frequency selective paging receivers in many different applications. For example, a paging system may include a number of groups of paging receivers. All of the reeds 16 in one group may be set to respond to one audio frequency control signal, the frequency being different in each of the other groups. In this way only a small portion of the receivers used in the system will be tuned "on" for any one calling signal. A further saving in power results. Each receiver in a group will have reeds 31, 32 responsive to a different pair of audio frequencies or calling signals. Only one of the receivers will respond to each calling signal to operate the alarm device associated therewith. As a further refinement, additional reeds may be connected in series with the collector electrode of transistor 37, as indicated by the dotted line 43. The additional reeds may be included in an additional resonant relay having a winding connected in series with winding 28. Assuming that two such additional reeds are used which are responsive to two audio frequency signals different from those to which the reeds 16, 31 and 32 respond, the calling signal will include the four signals, and so on. The additional reeds will, of course, increase correspondingly the number of receivers that can be used in the system. Further refinements and embodiments of the invention are possible without departing from the spirit thereof.

In an embodiment of the invention which has been constructed according to the arrangement shown in the drawing, the transistors 13 and 37 were PNP junction transistors identified in the art as 2N217, and the transistors 19, 20 were 2N218. However, other PNP transistors may be used. As understood in the art, NPN junction transistor of P type conductivity may be used by merely altering the electrode connections and the polarity of the voltages supplied thereto in a known manner.

Various components were given the following values. The values are, of course, given only by way of example.

| | | |
|---|---|---|
| Battery 10 | volts | 10 |
| Capacitor 23 | microfarads | 1.05 |
| Capacitor 26 | do | 25 |
| Resistor 14 | ohms | 10,000 |
| Resistor 24 | do | 470,000 |
| Resistor 25 | do | 10,000 |
| Resistor 27 | do | 220,000 |
| Resistor 22 | do | 10,000 |

Using the values given above, the "on" time of the receiver 5 was .2 second and the "off" time was 2 seconds, increasing the life of the battery 10 about 10 to 1. The control signal and audio tones of the calling signal were in the range of 300 cycles to 1000 cycles. The duration of the control and calling signals can, of course, be varied according to weather conditions and other factors and requirements in a particular application. The duration of the control signal should preferably be as long as a single cycle of the multivibrator 15, thereby insuring that the receiver 5 is turned on during the interval in which the control signal is received.

One of the advantages of the invention is that both the power saving and decoding functions are controlled by a common apparatus, namely, the relay 18, thus reducing the number of components required. The common connection to the reeds 16, 31, 32 of the relay 18 simplifies the relay construction, and permits the relay to be made smaller than could be done if the reeds had to be insulated from each other. The use of a tone for holding the receiver in the "on" condition permits the selective operation of groups or sets of receivers as mentioned above. This is an improvement over the squelch or carrier type of control where such selective operation is not possible. The invention is also simpler and less expensive to construct than a carrier or squelch control since noise amplifiers, rectifiers, direct current amplifiers, and so on, are not needed.

What is claimed is:

1. In combination, a pair of electron current flow control devices regeneratively connected to form an astable multivibrator, a switching device coupled to said multivibrator and arranged to alternately open and close in response to the operation of said multivibrator, means coupled to said switching device for maintaining said switching device closed regardless of the operation of said multivibrator, a source of power, a load, and means for coupling said switching device between said source and said load.

2. In combination, a pair of electron current flow control devices regeneratively connected to form an astable multivibrator, a switching device connected to one of said control devices, said switching device being arranged to alternately open and close in response to said one device being conducting and non-conducting, means coupled to said switching device to hold said switching device closed regardless of the operating condition of said one device, a source of power, a load, and means for coupling said switching device between said source and said load.

3. A combination as claimed in claim 2 and wherein said multivibrator is arranged so that the time during which said one device is non-conducting is greater than the time during which said one device is conducting.

4. In combination, first and second transistors regeneratively connected to form an astable multivibrator, a third transistor coupled to said first transistor and arranged to become conducting when said first transistor is conducting and non-conducting when said first transistor is non-conducting, said multivibrator being arranged so that the time during which said first transistor is non-conducting is greater than the time during which said first transistor is conducting, means coupled to said third transistor for causing said third transistor to become and to remain conducting regardless of the operating condition of said first transistor, a source of power, a load, and means for connecting said third transistor with said source and said load, whereby said third transistor completes an electrical path including said load and said source when conducting and interrupts said path when said third transistor is non-conducting.

5. A battery saver system for a small, portable, lightweight radio receiver which is adapted to be turned on and off automatically at a periodic rate while seeking a signal, comprising a pair of transistors regeneratively connected to form an astable multivibrator in which the first of said transistors is conducting while the second of said transistors is non-conducting and in which the second of said transistors is conducting while the first of said transistors is non-conducting, a switching transistor coupled to said first transistor for providing an electrical circuit that alternately opens and closes in response to said first transistor being conducting and non-conducting, means coupled to said switching transistor for operating said switching transistor to close said circuit and to maintain said circuit closed regardless of the operating condition of said first transistor, a source of battery power for energizing said radio receiver, and means for coupling said switching transistor between said source of battery power and said radio receiver.

6. A battery saver as claimed in claim 5 and wherein said multivibrator is set so that the time during which said first transistor is non-conducting is greater than the time during which said first transistor is conducting.

7. In combination, a pair of electron current flow control devices regeneratively connected to form an astable multivibrator, a switching device, means for coupling said switching device to one of said control devices and for causing said switching device to alternately open and close in response to said one device being conducting and non-conducting, a frequency selective circuit connected to said switching device and responsive to a signal of predetermined frequency to cause said switching device to close and to remain closed for the duration of said signal regardless of the operation of said first-mentioned means, a source of power, a load, and means for connecting said switching device in series with said load and said source, whereby said switching device completes an electrical path including said source and said load when closed and interrupts said path when open.

8. In combination, first and second transistors regeneratively connected to form an astable multivibrator, a third transistor coupled to said first transistor and arranged to become conducting when said first transistor is conducting and non-conducting when said first transistor is non-conducting, a frequency selective circuit connected to said third transistor and responsive to a signal of predetermined frequency to cause said third transistor to become conducting and to remain conducting for the duration of said signal regardless of the operation of said first transistor, a source of power, a load, and means for connecting said third transistor between said load and said source, said third transistor being operated to complete an electrical path between said load and said source when conducting and to interrupt said path when non-conducting.

9. A battery saver system for a small, portable, lightweight radio receiver which is adapted to be turned on and off automatically at a periodic rate while seeking a signal, comprising a pair of transistors regeneratively connected to form an astable multivibrator in which the first of said transistors is conducting while the second of said transistors is non-conducting and in which the second of said transistors is conducting while the first of said transistors is non-conducting, said multivibrator being set so that the time during which said first transistor is non-conducting is greater than the time during which said first transistor is conducting, a switching transistor coupled to said first transistor for providing an electrical circuit that alternately opens and closes in response to said first transistor being conducting and non-conducting, a frequency selective circuit connected to said switching transistor and responsive to a signal of predetermined frequency for operating said switching transistor to close said electrical circuit and to maintain said electrical circuit closed for the duration of said signal regardless of the operating condition of said first transistor, a source of battery power for energizing said radio receiver, and means for coupling said switching transistor between said source and said radio receiver so that said radio receiver is turned on and off according to the condition of said electrical circuit.

10. In combination, a switching device, means for causing said device to alternately open and close, a resonant relay having at least one vibrating reed circuit responsive to a signal of predetermined frequency and connected to said device, said circuit being responsive to the reception by said relay of said signal to cause said device to close and to remain closed for the duration of said signal regardless of the operation of said first-mentioned means, a source of power, a load, and means for connecting said device between said source and said load.

11. In combination, a pair of electron current flow control devices regeneratively connected to form an astable multivibrator, a switching device, means for coupling said switching device to one of said control devices and for causing said switching device to alternately open and close in response to said one device being conducting and non-conducting, a resonant relay having at least one vibrating reed circuit responsive to a signal of predetermined frequency and connected to said switching device, said circuit being responsive to the reception by said relay of said signal to cause said switching device to close and to remain closed for the duration of said signal regardless of the operation of said one control device, a source of power, a load, and means for connecting said switching device between said load and said source, whereby said switching device completes an electrical path including said source and said load when closed and interrupts said path when opened.

12. A power saving and decoding circuit for use with a radio receiver comprising a switching device, a source of power for energizing said receiver, means for connecting said device between said source and said receiver, means connected to said device for causing said device to alternately open and close, said device when closed completing an electrical path between said source and said receiver to turn on said receiver and interrupting said path to turn said receiver off when open, a resonant relay having a winding connected to the signal output circuit of said receiver and also having a first, second and third vibrating reed circuit, means for connecting said first circuit to said device, said first circuit being responsive to the reception by said winding of a signal of predetermined frequency when said receiver is turned on to cause said device to remain closed for the duration of said signal, an alarm circuit, means for connecting said second and third circuits to said alarm circuit, said second circuit being responsive to the reception by said winding of a second signal of predetermined frequency and said third circuit being responsive to the reception by said winding of a third signal of predetermined frequency at the time said first signal is being received to energize said alarm circuit, said first, second and third signals each being of a different frequency.

13. A power saving and decoding circuit for use with a radio receiver comprising a switching device, a source of power for energizing said receiver, means for connecting said switching device between said source and said receiver, a pair of electron current flow control devices regeneratively connected to form an astable multivibrator, means for connecting said switching device to one of said control devices for causing said switching device to alternately open and close in response to said one device being conducting and non-conducting, said switching device when closed completing an electrical path between said source and said receiver to turn on said receiver and interrupting said path to turn said receiver off when open, a resonant relay having a winding connected to the signal output circuit of said receiver and also having a first, second and third vibrating reed circuit, means for connecting said first circuit to said switching device, said first circuit being responsive to the reception by said winding of a signal of predetermined frequency when said receiver is turned on to cause said switching device to remain closed for the duration of said signal, an alarm circuit, means for connecting said second and third circuits to said alarm circuit, said second circuit being responsive to the reception by said winding of a second signal of predetermined frequency and said third circuit being responsive to the reception by said winding of a third signal of predetermined frequency at the time said first signal is being received to energize said alarm circuit, said first, second and third signals each being of a different frequency.

14. A power saving and decoding circuit for use with a radio receiver comprising a switching transistor, a source of power for energizing said receiver, means for connecting said switching transistor between said source and said receiver, first and second transistors regeneratively connected to form an astable multivibrator, means for connecting said switching transistor to said first transistor so as to cause said switching transistor to become conducting when said first transistor is conducting and non-conducting when said first transistor is non-conducting, said switching transistor when conducting completing an electrical path between said source and said receiver to turn on said receiver and interrupting said path to turn said receiver off when non-conducting, a resonant relay having a winding connected to the signal output circuit of said receiver and also having a first, second and third vibrating reed circuit, means for connecting said first circuit to said switching transistor, said first circuit being responsive to the reception by said winding of a signal of predetermined frequency when said receiver is turned on to cause said switching transistor to remain conducting for the duration of said signal, an alarm circuit, means for connecting said second and third circuits to said alarm circuit, said second circuit being responsive to the reception by said winding of a second signal of predetermined frequency and said third circuit being responsive to the reception by said winding of a third signal of predetermined frequency at the time said first signal is being received to energize said alarm circuit, said first, second and third signals each being of a different frequency.

15. A power saving and decoding circuit as claimed in claim 14 and wherein said multivibrator is set so that the interval in which said first transistor is non-conducting is greater than the interval in which said first transistor is conducting in each cycle of said multivibrator, said alarm circuit including a normally non-conducting transistor responsive to the operation of said second and third circuits to energize an alarm device.

16. A power saving and decoding circuit for use with a radio receiver comprising a switching device, a source of power for energizing said receiver, means for connecting said device between said source and said receiver, driving means connected to said device for causing said device to alternately open and close, said device when closed completing an electrical path between said source and said receiver to turn on said receiver and interrupting said path to turn said receiver off when open, a resonant relay having a winding connected to the signal output circuit of said receiver and also having first and second vibrating reed circuits, means for connecting said first reed circuit to said device, said first reed circuit being responsive to the reception by said winding of a signal of predetermined frequency when said receiver is turned on to cause said device to remain closed for the duration of said signal regardless of the operation of said driving means, an alarm circuit, means for connecting said second reed circuit to said alarm circuit, said second reed circuit being responsive to the reception by said winding of a second signal of predetermined frequency at the time said first signal is being received to energize said alarm circuit, said first and second signals being of different frequency.

17. In combination, a multivibrator adapted to operate continuously, a switching device coupled to said multivibrator and arranged to alternately open and close in response to the operation of said multivibrator, a radio receiver, a source of power in common for said multivibrator and said receiver, said source of power being coupled to said radio receiver through said switching device in the closed position of said switching device, means coupled and responsive to the output of said receiver for automatically maintaining said switching device continuously closed regardless of the operation of said multivibrator, and only substantially so long as signals are being received by said receiver.

18. A power saving system comprising the combination defined in claim 17, wherein said radio receiver is portable and light weight and adapted to be carried on the person, and wherein said multivibrator and switching device include transistors.

19. A combination as defined in claim 17 and wherein said means coupled and responsive to the output of said receiver includes means responsive only to a signal of given frequency at the output of said receiver, said first-mentioned means maintaining said switching device closed only upon the occurrence of and for the duration of said signal.

References Cited in the file of this patent

UNITED STATES PATENTS

| | | |
|---|---|---|
| 1,804,675 | Clausen | May 12, 1931 |
| 2,136,621 | King et al. | Nov. 15, 1938 |
| 2,579,470 | Brown | Dec. 25, 1951 |
| 2,718,613 | Harris | Sept. 20, 1955 |
| 2,744,198 | Raisbeck | May 1, 1956 |
| 2,776,420 | Woll | Jan. 1, 1957 |